United States Patent [19]
Behr

[11] Patent Number: 5,120,125
[45] Date of Patent: Jun. 9, 1992

[54] OVERHEAD PROJECTOR WITH SMALL AND LARGE STAGE SURFACES

[75] Inventor: Karl-Gunther Behr, Biebertal-Vetzberg, Fed. Rep. of Germany

[73] Assignee: ProCent, Patent- und Verwaltungs AG, Zurich, Switzerland

[21] Appl. No.: 673,383

[22] Filed: Mar. 22, 1991

[30] Foreign Application Priority Data

Dec. 19, 1990 [DE] Fed. Rep. of Germany ... 9017123[U]

[51] Int. Cl.⁵ ............................................. G03B 21/06
[52] U.S. Cl. .................................. 353/102; 353/122; 353/38; 353/DIG. 3
[58] Field of Search ............... 353/DIG. 3, 102, 98, 353/38, 120, 122, 119, DIG. 6, 63, 101, 100

[56] References Cited

U.S. PATENT DOCUMENTS

| | | | |
|---|---|---|---|
| 4,080,052 | 3/1978 | Levin et al. | 353/DIG. 3 |
| 4,089,599 | 5/1978 | Kuboshima | 353/DIG. 3 |
| 4,338,006 | 7/1982 | Ozeki | 353/DIG. 3 |

FOREIGN PATENT DOCUMENTS 0177524 10/1984 Japan ............................ 353/DIG. 3

Primary Examiner—William A. Cuchlinski, Jr.
Assistant Examiner—William C. Dowling
Attorney, Agent, or Firm—Longacre & White

[57] ABSTRACT

This invention is for an overhead projector to be used with at least one large stage aperture and a small stage aperture above a Fresnel lens, comprising a light source mounted below the plane of the stage, characterized by a single or multi-element condenser which can be positioned between the lamp housing and Fresnel lens. In the case of a small stage aperture, the condenser focuses the light flux designed for the large stage aperture onto the small stage aperture.

6 Claims, 2 Drawing Sheets

FIG. 1
FIG. 2
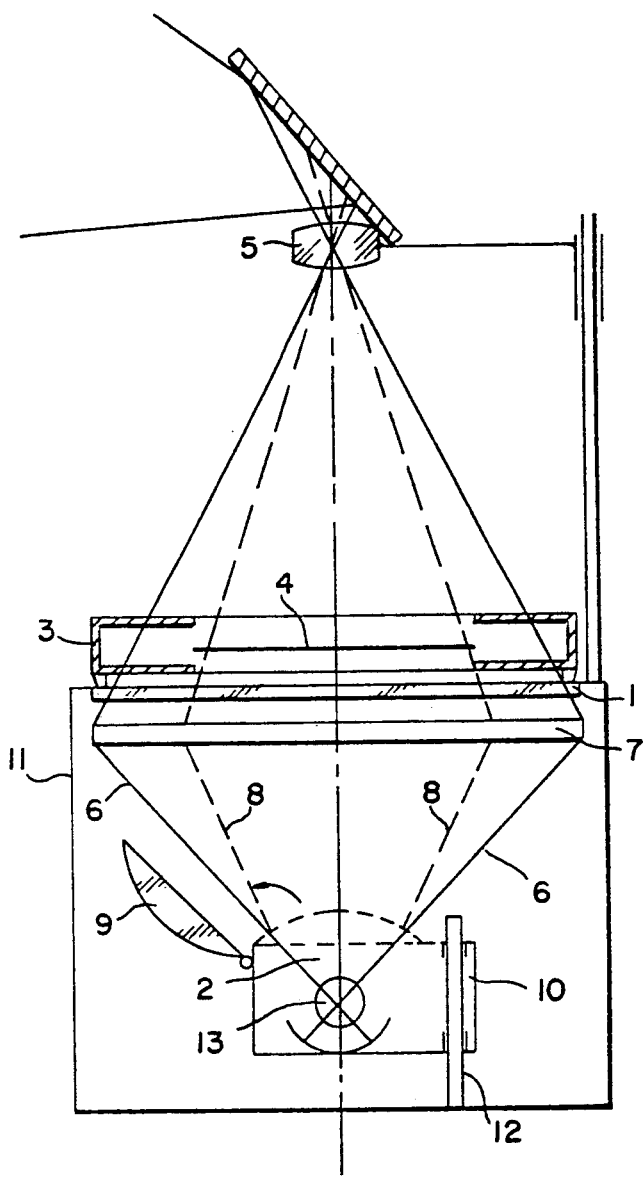
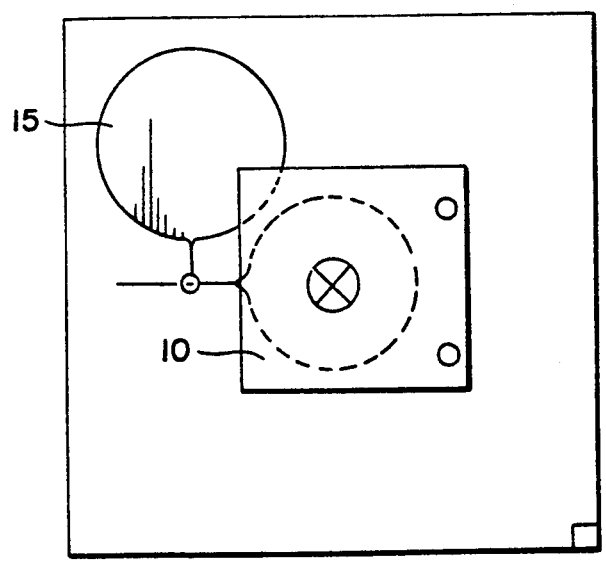

5,120,125

OVERHEAD PROJECTOR WITH SMALL AND LARGE STAGE SURFACES

BACKGROUND OF THE INVENTION

1. Field of the Invention

This invention is for an overhead projector to be used with at least one large stage aperture and a small stage aperture above a Fresnel lens, and with a light source mounted below the plane of the stage, characterized by a single or multi-element condenser which can be positioned between the lamp housing and Fresnel lens. In the case of a small stage aperture, the condenser focuses the light flux designed for the large stage aperture onto the small stage aperture.

2. Description of the Prior Art

Generally, the stage aperture of an overhead projector is matched to the DIN A4 format, which has a size of about 285×285 mm. Consequently, the illumination is also designed for these dimensions. The reflector lamp and any following condenser, and the Fresnel lens mounted below the operational surface, are so matched to the 285×285 mm dimensions that the maximum possible light flux passes into the operational surface and the projection lens.

If, however, less than a full stage aperture shall be used for projection, then the light flux emitted by the lamp shall be needlessly spread over the entire surface of the stage. For example, with LCD (liquid crystal displays) overhead displays, the image screen data of a data-processing apparatus is transmitted by an overhead projector onto a projection wall and thereby is made visible to a substantial number of viewers. The color displays in particular are quite dense and therefore require a highly efficient light flux so that data details can be recognized on the projection wall. It would make sense to guide the available luminous light flux only through this lesser stage aperture in order to substantially increase the luminous light intensity there. As in the case of the LCD, this is especially advantageous when the artwork on this smaller stage aperture is denser than the artwork transparency ordinarily used on the larger stage aperture.

SUMMARY OF THE INVENTION

This invention is an overhead projector with at least one large and one small stage aperture above a Fresnel lens with a light source mounted below the plane of the stage. The projector is characterized by a single or multi-element condenser which can be swung or snapped into position between the lamp housing and the Fresnel lens. It is the object of the present invention to create an overhead projector wherein the light flux from a lamp can be selectively spread over a large or small stage aperture. When a small stage surface is being used, the invention can focus the light flux otherwise wasted on the edges of the display onto the small stage aperture and thereby to correspondingly increase the luminous intensity at this surface. In the case of the small stage aperture, the condenser focuses the light flux designed for the large stage aperture onto the small stage aperture.

The condenser can be snapped or swung into position in the light beam in addition to or in lieu of a condenser illuminating the large stage aperture. Clearly the already present condenser may be moved out of the way when the new one is inserted. There are many technically possible designs implementing the concept of the invention. What is essential is only that the new or additional condenser focus the light flux previously illuminating the entire stage onto the small stage aperture and increase the latter's brightness.

Sometimes, data or other information may be present on the edge of the displays or of the artwork and may be important temporarily or permanently on the edge of the displays or of the artwork. Additionally, the displays or the artwork frequently is best placed off center on the total stage because the beam passes in known manner over a mirror oblique to it toward the projection wall, where this mirror will provide a picture with parallel vertical edges only when the optic axis passes horizontally between the mirror and the projection surface. Usually, however, the mirror is raised so that the viewers in the rear rows also can see the projected image. In that case, the vertical image edges converge downward. To compensate, the snap-in or swing condenser can be displaced transversely to the optic axis of the illumination beam by a distance (x) in order to optimally illuminate preferred lateral parts of the stage aperture or to centrally illuminate artwork placed acentrically on the stage.

The transverse displacement by a distance (x) is integrated into the snap-in or swing-in device. In another embodiment, the snap-in or swing-in condenser can be hinged on the fixed or movable lamp housing. In order to be snapped or swung into the beam, the condenser is operationally linked to an actuation lever accessible from outside the projector housing. Additionally, the overhead projector can have a tipping stage characterized in that when the stage is tipped, the condenser can be directly manually tipped or pivoted.

BRIEF DESCRIPTION OF THE DRAWINGS

FIG. 1 is a schematic elevation of an overhead projector with the swing-in condenser of the invention.

FIG. 2 is a schematic sectional top view of the projector with a swing-in condenser.

DETAILED DESCRIPTION OF THE INVENTION

Figure 3:
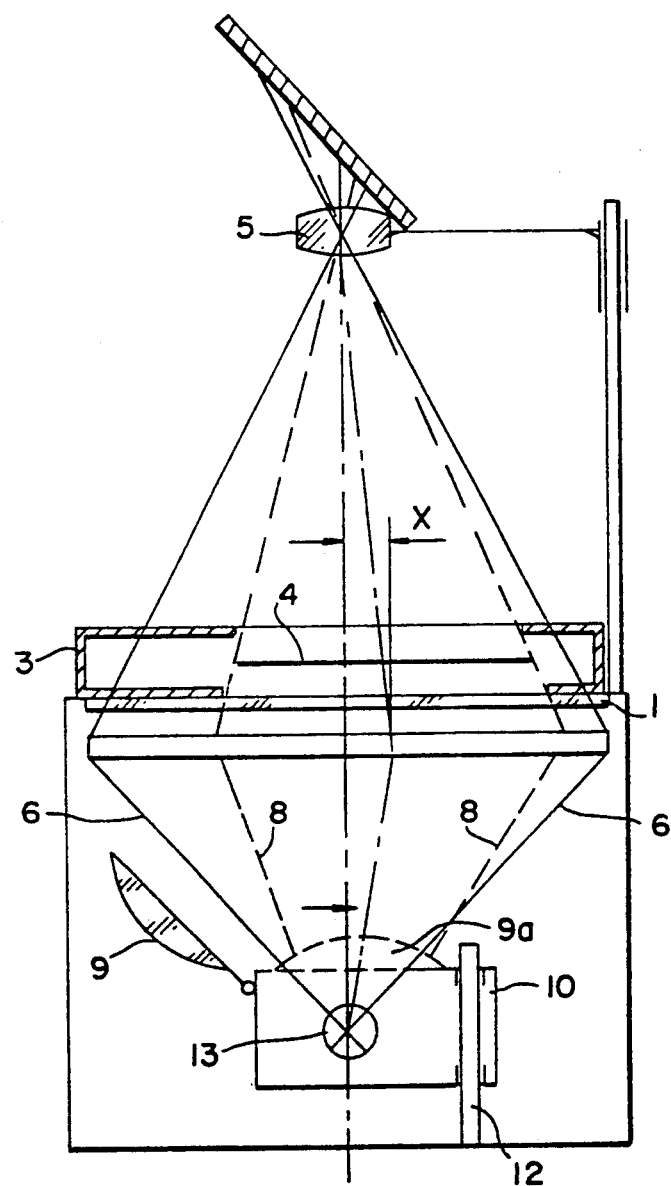
FIG. 3 is an overhead projector as in FIG. 1 but with a laterally displaceable condenser.

FIG. 1 shows the standard stage aperture 1 which is mounted in a known manner above an illumination system with lamp 13. The Fresnel lens 7 is located below the stage 1. Above the Fresnel lens 7 is the projection lens 5.

A liquid crystal overhead display 3 is set on the stage 1 and contains a framed liquid crystal screen 4. This screen 4 displays the data which is to be projected on a projection surface (not shown). As shown in the drawing, the liquid-crystal screen which must be reproduced is substantially smaller than the stage 1. There is thus no need to retain the light beam 6 illuminating the entire normal stage aperture 1 to project the data. Accordingly, the invention provides an additional condenser lens 9 which is swung into the illumination beam 6 when projecting the LC displays 3 and which now focuses the entire light flux emitted by the lamp 13 onto the liquid crystal screen 4 The illumination intensity at this screen 4 increases commensurately and the projected image is therefore brighter.

As noted the condenser lens 9 can be swung-in or snapped in; it can be the sole lens or it can act as a supplementary lens. It also can replace an otherwise present condenser in the light beam 6, in which case the otherwise present condenser is snapped or swung out of the way. FIG. 1 shows a snap-in condenser lens 9 whereas FIG. 2 shows a swing-in condenser lens 15. Together with the lamp housing 10, the condenser 9 may also be moved in guides 12 along the optic axis for the purpose of achieving optimal illumination of the particular stage aperture 1.

FIG. 3 shows an embodiment in which the condenser lens 9 is in its snap-in position by a distance "x" transversely to the optic axis. This embodiment mode shall be advantageous when the liquid-crystal screen 4 is acentric to the stage 1. This lateral offset of the condenser 9 makes it possible to uniformly illuminate the liquid crystal screen 4 in spite of its shifted position on the stage 1.

Even though the invention was described and shown above mainly in relation to an LC overhead display 3, it is clear per se that the new beam guidance is applicable wherever an aperture less than the normal stage 1 shall be projected.

The invention applies to all overhead projectors equipped with a light source below the plane of the stage. Mostly, these are projectors in which the lamp is below the stage and Fresnel lens and in the optic axis. This invention is applicable to projectors with their lamps sideways and below the stage and where the illumination beam is deflected by an oblique mirror below the Fresnel lens toward the stage. However, the invention cannot be carried out on projectors with the light source above the plane of the stage, which therefore are often but incorrectly called "reflected light" projectors.

Although particular embodiments of the present invention have been described and illustrated herein, it should be recognized that modifications and variations may readily occur to those skilled in the art and that such modifications and variations may be made without departing from the spirit and scope of our invention. Consequently, the invention as claimed below may be practiced otherwise than as specifically described above.

What is claimed is:

1. An overhead projector to be used with at least one large stage aperture and a small stage aperture above a Fresnel lens, said overhead projector comprising:
   a light source positioned along an optical axis and mounted below a plane containing said large stage aperture, said light source emitting light beams along a path; and
   a movable condenser adapted to be positioned between said light source and said Fresnel lens so as to be optionally insertable into said path,
   wherein said condenser re-focuses said light beams from said large stage aperture onto said small stage aperture when said condenser is inserted into said path.

2. An overhead projector according to claim 1, wherein said movable condenser supplements a condenser focusing said light beams on said large stage aperture.

3. An overhead projector according to claim 1, wherein said movable condenser supplants a condenser focusing said light beam on said large stage aperture.

4. An overhead projector according to claim 1, wherein said movable condenser is adapted to be displaced transversely to said optic axis for optimally illuminating preferred lateral parts of a stage aperture selected from the group consisting of said large stage aperture and said small stage aperture.

5. An overhead projector according to claim 1, wherein said movable condenser is operationally linked to an actuation lever for positioning said movable condenser, said actuation lever extending outside an exterior housing for said overhead projector.

6. An overhead projector according to claim 1, further comprising a tipping stage, wherein said movable condenser is accessible for manually positioning said movable condenser when said tipping stage is tipped.

* * * * *